United States Patent [19]

Durtnal

[11] 4,347,640
[45] Sep. 7, 1982

[54] CONNECTOR ASSEMBLIES FOR CONNECTING WIPER BLADES TO WIPER ARMS

[75] Inventor: Graham Durtnal, London, England

[73] Assignee: Trico Products Corporation, Buffalo, N.Y.

[21] Appl. No.: 202,249

[22] Filed: Oct. 30, 1980

[51] Int. Cl.³ .............................................. B60S 1/40
[52] U.S. Cl. .............................. 15/250.32; 15/250 A; 15/250.23
[58] Field of Search ........... 15/250.21, 250.23, 250.16, 15/250.32, 250 A

[56] References Cited

U.S. PATENT DOCUMENTS

| | | |
|---|---|---|
| 1,727,456 | 9/1929 | Uddenborg. |
| 2,587,168 | 2/1952 | Kessler .......................... 15/250.23 X |
| 3,453,679 | 7/1969 | Thorlakson ..................... 15/250.16 |
| 3,660,862 | 5/1972 | Scinta ............................. 15/250.23 |
| 4,208,759 | 6/1980 | Nixon ............................. 15/250.23 |

FOREIGN PATENT DOCUMENTS 2518399 11/1976 Fed. Rep. of Germany.
2622437 12/1977 Fed. Rep. of Germany.
2362029 4/1978 France ............................. 15/250.23

Primary Examiner—Peter Feldman
Attorney, Agent, or Firm—E. Herbert Liss

[57] ABSTRACT

A connector assembly, for use in connecting a wiper arm and a wiper blade for pivotal movement of the blade in relation to the arm about a common axis which in use is substantially perpendicular to the surface to be wiped, comprises two basic parts, namely a first part (11) for attachment to the wiper arm and a second part (12) for attachment directly or indirectly to the wiper blade, the parts being pivotally connected together for relative angular movement about the common axis (13). The assembly includes a discrete element (33) arranged for rotation about the common axis in relation to one of the parts (11) and there are two first abutment faces (31, 32) on that part (11), and two second abutment faces (36, 37) on the discrete element, the second faces being arranged to co-operate with the respective first faces to limit the range of relative angular movement of the two parts (11, 12) about the common axis. A coil spring 38 acts between the two parts (11, 12), and a tail (40) of the spring couples the element (33) to the other part (12).

8 Claims, 6 Drawing Figures

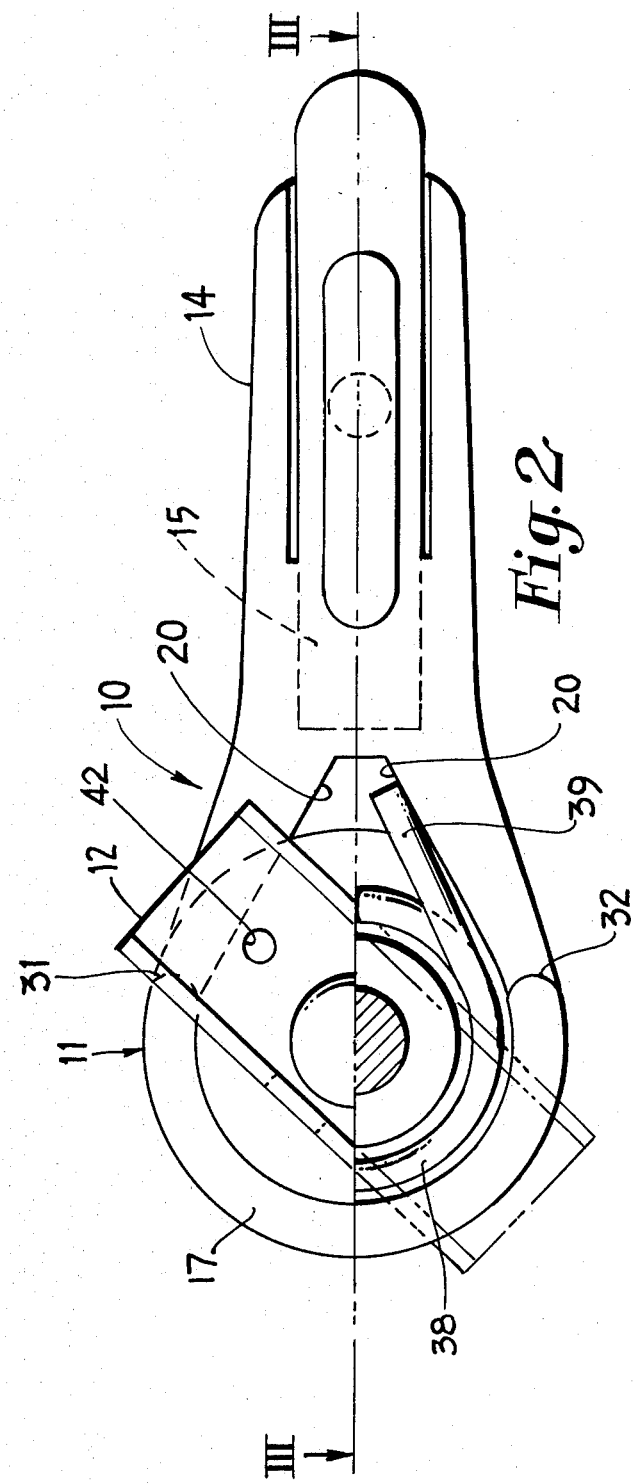

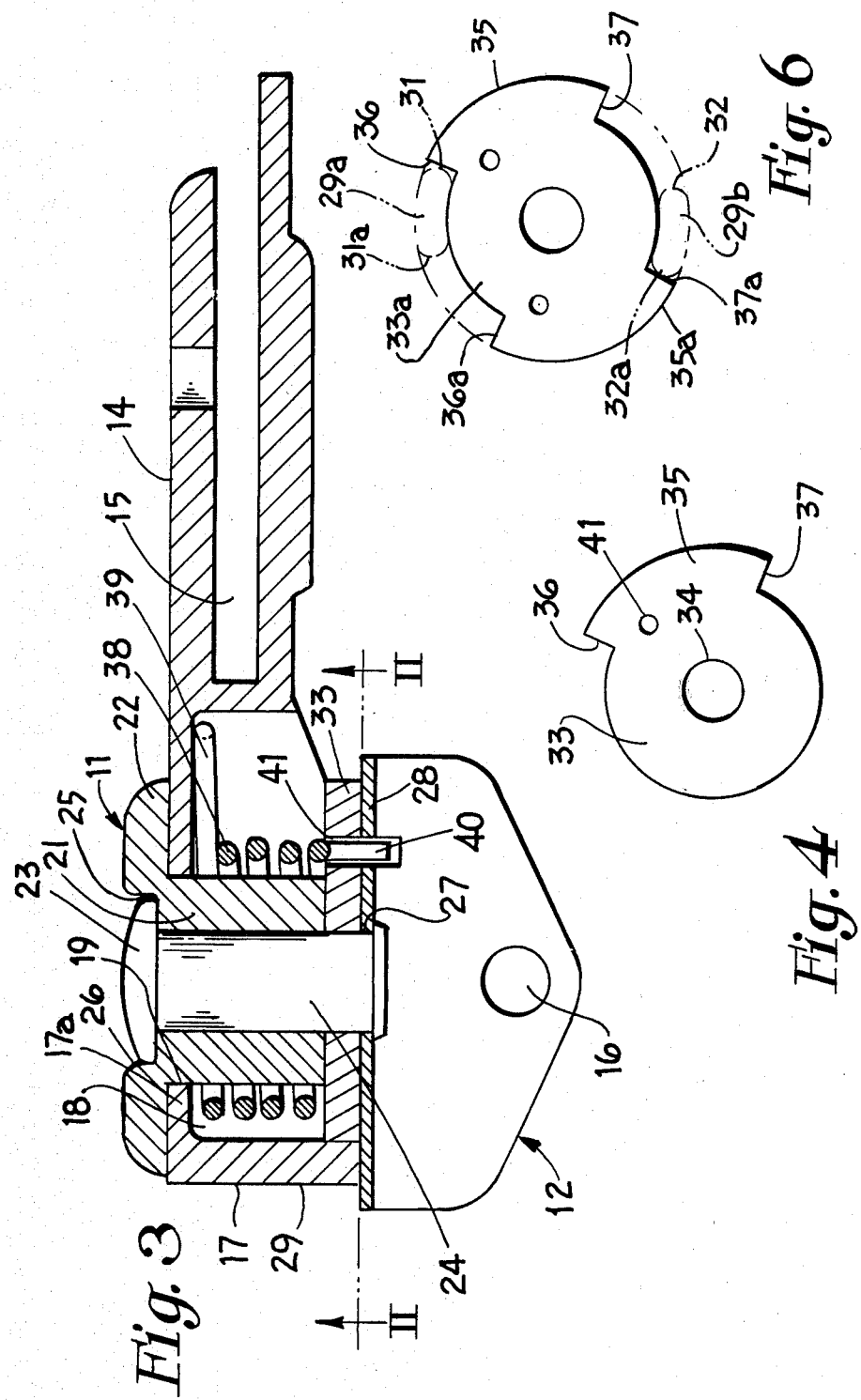

CONNECTOR ASSEMBLIES FOR CONNECTING WIPER BLADES TO WIPER ARMS

This invention relates to connector assemblies for use in connecting wiper blades to wiper arms in arrangements for wiping surfaces such as the lenses or protective glasses of headlights on motor vehicles, rear-view mirrors, and windscreens.

In order to maximise the surface wiped using a wiper blade oscillated by an arm about an axis outside a rim surrounding the glass, it is often the practice, particularly in relation to headlamps, to mount the wiper blade on a connector assembly secured to the wiper arm, permitting certain relative angular movement of the blade in relation th the earm about a common axis which is use is substantially perpendicular to the surface to be wiped. The operation of a known connector assembly of this kind will now be described with reference to FIG. 1 of the accompanying drawings. This shows an example of a known headlamp wiping arrangement, and is a front elevation.

The headlamp front glass has a substantially rectangular outline 1. The wiper blade unit 2 is carried by a wiper arm 3, operated by a wiper shaft at 4. The arm has a permanent bend at 5. The outer end of the arm is connected to the middle of the blade unit 2 by a connector assembly 6.

In the parked position the blade unit lies at A, aligned with the adjacent part of the arm, and parallel and closely adjacent to the neighbouring edge of the glass. The connector assembly incorporates a spring tending to incline the blade in relation to the arm, but while the blade is in its parked position A, a stop 7 at the parked position, or a rim around the headlamp, prevents the blade from rotation about an axis 13. This axis passes through the connector assembly and intersects (nominally at right angles) the plane of the glass surface to be wiped. During the first part of an outward wiper arm stroke (i.e., away from the parked position A) the blade is progressively inclined by the spring until (at B) a pair of abutments (not shown) within the connector assembly 6 prevent further increase in inclination of the blade in relation to the arm. The extent of the inclination is such that, when the arm has completed its outward stroke (at C), the blade lies parallel to the edge of the glass opposite the parked position. In this manner an area of glass is wiped which would otherwise have been missed out had the blade maintained a fixed angular relationship to the arm throughout the arm stroke.

In the first part of the inward stroke, the blade is carried from C to B and then encounters the stop or rim. During the remainder of the inward stroke, the blade progressively pivots relatively to the arm, and finishes at position A (identical with the parked position).

In that and other prior connector assemblies the range of relative rotation of the wiper blade unit and wiper arm is limited by suitably placed abutments formed on the two principal coaxial parts of the connector assembly. These two parts are basic to the assembly, one part being adapted to be attached to the wiper arm and the other part being adapted to be attached to the blade. The range of relative rotation possible with any particularly assembly has been fixed by the spacing of abutment surfaces on the two parts. The spacing is determined by design, and produced in manufacture, and consequently is suited to a particular combination of factors, including the location of the wiper arm spingle axis in relation to the area to be wiped, and the lengths of the arm and blade, which factors are peculiar to each model of vehicle. Thus each connector assembly has tended to be redesigned, manufactured and stocked, having in mind application to a particular model of vehicle.

A variety of applications of the assembly demanding different ranges of angular movement of the blade in relation to the arm may be served by providing the two basic parts plus a plurality of the discrete elements, these elements differing in the spacing of the abutment faces thereon. For a particular application, the appropriate element is selected and is assembled with the two basic parts.

Preferably the element is a disc with a central hole through which the common axis of the assembly extends, the disc being arranged between the two basic parts of the assembly and provided with a pair of angularly spaced second abutment faces.

Preferably there is a radial extension of a sector of the disc, the radial faces of the extension constituting the second abutment faces.

One of the basic parts and the element may be releasably coupled for rotation about the common axis and be separable from each other and from the other basic part, to enable substitution of the element to be made.

The assembly preferably includes spring means arranged to act between the element and one of the basic parts to urge one of the second abutment faces into engagement with one of the first abutment faces.

The spring means is conveniently a coil spring surrounding the common axis of the assembly.

The principle object of the present invention is to provide an improved windscreen wiper arm to blade connector in which the range of applicability is broadened.

Other objects and advantages of the invention will be apparent from the following detailed description taken in connection with the accompanying drawings.

FIG. 2 is an underside plan of a first embodiment of the invention, partly in section on line II—II of FIG. 3, indicating the normal angular relationship between a part for receiving a wiper arm termination and another part for receiving a wiper blade (i.e. the relationship at B and C in FIG. 1);

FIG. 3 is a longitudinal section of the first embodiment on the line III—III in FIG. 2, but indicating the relationship of the parts when at A in FIG. 1;

FIG. 4 is an underside plan of an element of the first embodiment;

FIG. 6 is an underside diagrammatic view of a second embodiment of the invention.

Figure 1:
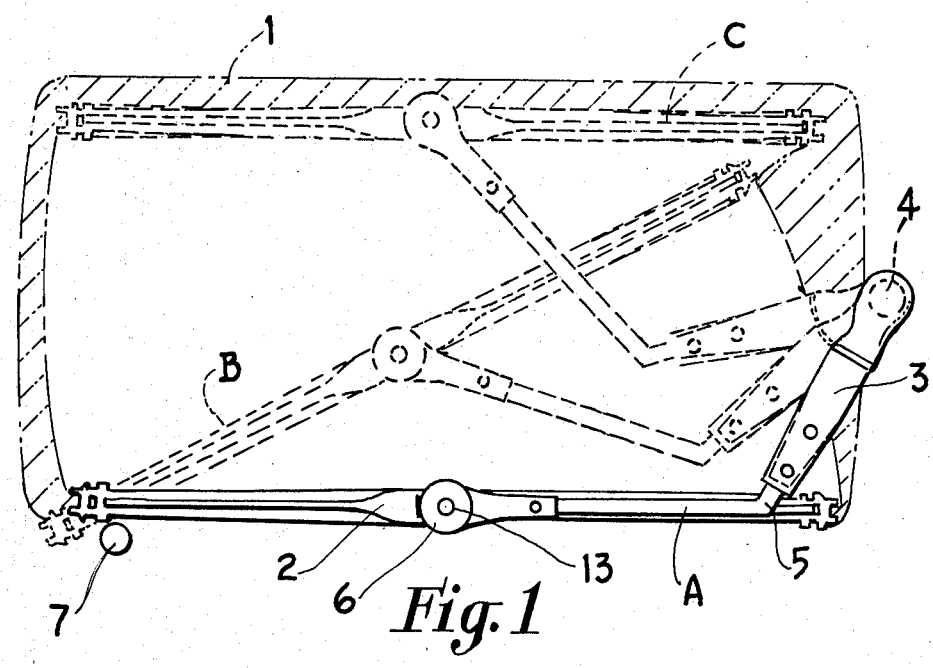
FIG. 1 shows a known arrangement, already described earlier in this specification.

Referring to FIGS. 2 and 3, the connector assembly 10 comprises two basic parts 11, 12. These parts 11, 12 are relatively rotatable about a common axis 13 extending through the assembly 10. (Where components in FIGS. 2 to 4 correspond in function to components in FIG. 1, we use the same reference numerals).

Part 11 is for attachment to a wiper arm and the other part 12 is for connection to a wiper blade. In this example part 11 has an arm 14 providing a known socket termination 15 for receiving and releasably fastening a wiper arm with a known bayonet fixing termination. Also, part 12 is of channel section and extends lengthwise at right angles to axis 13. The part is pierced at opposite sides by holes 16 to form a known saddle, which can be mounted on a rigid backing strip of a wiper blade, and receive a pivot pin connection through the holes 16.

The arm 14 of part 11 radiates from a generally cylindrical body portion 17 having a deep central recess 18 and an upper end wall 17a, in which is a central circular eye 19. At the junction of the arm 14 and the body 17, the recess 18 has tangential walls 20 which extend it laterally somewhat towards the inner end of the socket in arm 14. The eye 19 supports a bushing 21 for rotation about its central axis. The bushing 21 is retained at one end by engagement of an external flange 22 on the bushing with the end wall 17a of the body surrounding the eye 19, and with the head 23 of the rivet 24 which rotates the bushing 21. The head 23 engages a shoulder 25 in a counterbore 26 in bushing 21 at its flanged end. The shank of the rivet 24 extends from bushing 21 and recess 18 through a corresponding hole 27 in the web 28 of the channel-section part 12, and is expanded to retain parts 11, 12 in an assembled condition, in which they are close to one another but with clearance for relative rotation about the central axis.

Bushing 21 projects into recess 18 but does not reach as far downwards as the plane of the rim 29 of recess 18 adjacent to part 12. Bushing 21 thus defines a part-annular space between itself and the walls of recess 18, the space being extended laterally of the bushing by the tangential walls 20 of recess 18.

The rim 29 of recess 18 is interrupted at the side adjoining the arm 14 to provide a pair of angularly spaced first abutment faces 31, 32. The spacing between them in this example is about 140°.

An element 33 is arranged between the bushing 21 and the part 12. Element 33, see also FIG. 4, is essentially a disc with a central hole 34 to receive the rivet 24. The radius of the element 33, for the majority of its circumference, is a little less than that of the recess 18, to ensure freedom of rotation in relation to part 11. The element has a radially enlarged sector 35 subtending an angle of about 90° at axis 13. The radial faces of sector 35 constitute second abutment faces 36, 37 which can respectively engage abutment faces 31, 32 on part 11, depending on the sense and extent of relative rotation between element 33 and part 11.

The annular space between the recess 18 and bushing 21 contains a helical coil spring 38 surrounding bushing 21. The end 39 of the spring adjacent to the end wall 17a extends tangentially and engages one of the tangential walls 20 of recess 18. The other end or tail 40 of spring 38 is bent to lie parallel to axis 13 and extends through two corresponding holes 41, 42 in succession, one hole 41 being in element 33 and the other hole 42 being in web 28 of part 12.

The direction of the length of the channel of part 12 is normally inclined to the longitudinal axis of arm 14 of part 11 as can be seen in FIG. 2. Spring 38 is prestressed torsionally about the central axis of bushing 21 during installation, so that the spring end 39 reacts against the adjoining tangential wall 20 and the tail 40 urges abutment faces 31, 36 into contact. Thus the spring normally holds the element 33 and the channel of part 12 in the relationship with arm 14 seen in FIG. 2. A wiper blade mounted in the channel of part 12, and a wiper arm inserted in the socketed arm 14, would be held in a similar relationship, as at B or C in FIG. 1.

If part 12 is rotated about axis 13 relatively to part 11, as it would be between B and A in FIG. 1, during the inward wiper arm stroke after the wiper blade has contacted the stop or rim and become deflected from its normal inclination to the wiper arm, then part 12, element 33, bushing 21 and rivet 24 rotate as a unit because of the friction between them, the tail 40 of the spring in any event maintaining the angular relationship between part 12 and element 33. Loading on spring coil 38 is increased by the rotation. The rotation can continue until stopped by contact between abutment faces 32, 37. These abutment faces 32, 37 protect the spring 38 against any danger of over-stressing if the blade should encounter a foreign object (e.g. packed snow or ice), or if the arm should be carried too far by the wiper shaft, at the end of a stroke. In this example the channel of part 12 is now in alignment with arm 14 of part 11.

When restraint is removed from part 12, as in FIG. 1 between A and B during the outward stroke of the wiper arm, then spring 38 urges element 33 and part 12 to counter-rotate relative to part 11. Counter-rotation ceases when contact is made between abutment faces 31, 36.

It will be appreciated that the possible extent of angular movement between parts 11, 12, and hence deflection of the wiper blade in relation to the wiper arm, is dependent upon the relative angular spacing of abutment faces 31, 32 and 36, 37. Thus it is possible to make up assemblies embodying like counterparts of parts 11, 12 but dissimilar elements 33 (differing in the angular spacing of abutment faces 36, 37) and thereby provide assemblies with corresponding differences in the possible extent of angular movement between parts 11, 12.

It is also possible to provide assemblies which are mirror images of each other (e.g. for use respectively on a left-side and a right-side headlight) by using the same two basic parts 11, 12, but two springs, one of which is a mirror image of spring 38, and the same element 33 but inverted.

Figure 5:
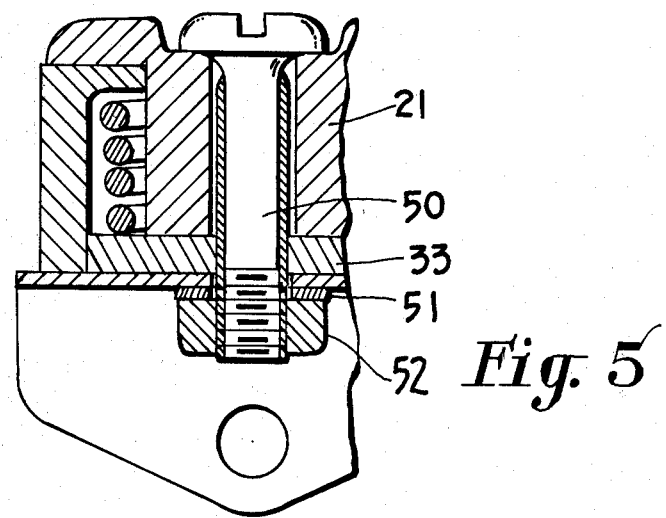
FIG. 5 is a view corresponding to the left part of FIG. 3, but showing a modification.

FIG. 5 shows a modification in which the rivet 24 is replaced by a bolt 50, washer 51, and self-locking nut 52. This enables an assembly to be converted by dismantling, exchanging the element 33 for a different element, and re-assembling.

FIG. 6 shows an assembly in which a single element can provide two alternative ranges of relative angular movement.

In FIG. 6, element 33a corresponds to element 33 of the first embodiment except for an additional radial extension 35a and another pair of second abutment faces 36a, 37a or different angular spacing, say 100°, from abutment faces 26, 27 (90°), the two pairs of abutment faces being arranged on opposite sides of a diameter of the disc. Similarly the rim 29 on part 11 is modified by interrupting it to produce two angularly spaced lands 29a, 29b defined between first abutment face 31 and end 31a, and first abutment face 32 and end 32a respectively. The spacing between ends 31a, 31a (a minimum of say 150°) exceeds the spacing between abutment faces 31, 32 (140°), and the lands 29a, 29b are equal, so that irrespective of which sector extension of element 33a lies between ends 31a, 32a, the sector extension between abutment faces 31, 32 will operate to determine the possible extent of rotation of element 33a relative to part 11. As to which of the two ranges mentioned is produced by assembling part 12 and the modified part 11 and element 33a depends upon whether faces 36 and 37 or 36a and 37a are arranged between faces 31, 32 during assembly of the connector.

Another possibility, not shown is to omit the additional extension and the faces 36a, 37a and revert to the form of element 33 shown in FIG. 4. Then the extent of rotation is determined by the faces 36, 37 lying either in the space between the faces 31, 32 or in the larger space between the ends 31a, 32a. These ends then serve as further first abutment faces.

The abutment faces on the discrete element are not necessarily on a radial extension. For example they may be on an axial extension, or on a pair of radial or axial pins.

One might omit the spring 38 from the assembly, and provide a pin in place of the tail 40 to couple the element 33 to the part 12. Then, referring to FIG. 1, one would need a stop or rim at the top edge of the glass as well as at the bottom, and the sequence of movements in the outward stroke would differ from that earlier described: the blade unit would remain parallel to the arm in the first part of the outward stroke, and would rotate relative to the arm during the second part of the outward stroke, upon reaching the upper stop or rim. If desired, there may be deliberate provision of friction between the element 33 and the part 11.

A unique arm to blade connector has been shown and described for the purpose of illustration which renders the arm and blade assembly readily adaptable for cleaning windscreens and lenses of diverse dimensions and which can readily be changed for various applications. Although certain specific embodiments have been shown and described for the purpose of illustration it will be apparent that various other embodiments and modifications are possible within the scope of the invention. For example, other and different types of blade holders may be used; the shoulder may extend radially instead of axially; and the stops may be arranged to act in a single direction only. It is to be understood, therefore, that the invention is not limited to the specific arrangements shown but in its broadest aspects it includes all equivalent embodiments and modifications which come within the scope of the invention.

I claim:

1. A connector assembly for use in connecting a wiper arm and a wiper blade for pivotal movement of the blade in relation to the arm about a common axis which in use is substantially perpendicular to the surface to be wiped, the assembly comprising a first basic part for attachment to the wiper arm and a second basic part for attachment to the wiper blade, the parts being pivotally connected together for relative angular movement about the common axis, the assembly being characterized by the inclusion of a discrete element arranged for rotation about the common axis relative to one of the two basic parts, first abutment means on said one basic part and second abutment means on said discrete element disposed for engagement with said first abutment means to limit the range of angular movement of said basic parts relative to each other and normally loaded spring means for biasing said first and second abutment means into engagement with each other.

2. A connector assembly according to claim 1, in which the discrete element is coupled to one of the basic parts for rotation there with about the common axis, the first abutment means comprises two first abutment faces on the other of the basic parts and the second abutment means comprises two second abutment faces on the discrete element.

3. A connector assembly according to claim 2, characterized in that the discrete element is a disc with a central hole through which the common axis of the assembly extends, the disc being arranged between the two basic parts of the assembly and provided with a pair of angularly spaced second abutment faces.

4. A connector assembly according to claim 3, characterized by a radial extension of the sector of the disc, the radial faces of the extension constituting the second abutment faces.

5. A connector assembly for use in connecting a wiper arm and a wiper blade for pivotal movement of the blade in relation to the arm about a common axis which in use is substantially perpendicular to the surface to be wiped, the assembly comprising a first basic part for attachment to the wiper arm and a second basic part for attachment to the wiper blade, the parts being pivotally connected together for relative angular movement about the common axis, the assembly being characterized by the inclusion of a disc arranged between the two basic parts of the assembly with a central hole through which the common axis of the assembly extends, the disc being coupled to one of the basic parts for rotation therewith about the common axis, two first abutment faces on the other of the basic parts, two pairs of second abutment faces on the disc on opposite sides of a diameter of the disc, the angular spacing between one pair differing from the angular spcing of the other pair only one such pair being operative in the assembled connector according to the arrangement of the pair during assembly of the connector in relation to the first abutment faces, the operative pair being disposed for engagement with the first abutment faces to limit the range of angular movement of said basic parts relative to each other, the two pairs of second abutment faces providing alternate choices of possible range of relative angular movement.

6. A connector assembly according to claim 1 characterized in that one of the basic parts and the discrete element are releasably coupled for rotation about the common axis and are separable from each other and from the other basic part to enable substitution of the element to be made.

7. A connector assembly according to claim 1 characterized by spring means arranged to act between the discrete element and one of the basic parts to urge one of the second abutment faces into engagement with one of the first abutment faces.

8. A connector assembly according to claim 7, characterized in that the spring means is a coil spring surrounding the common axis of the assembly.

* * * * *